United States Patent
Cazenave et al.

[11] Patent Number: 6,145,531
[45] Date of Patent: Nov. 14, 2000

[54] TEMPERATURE SENSITIVE VALVE DEVICE

[76] Inventors: Craig Richard Cazenave, 2601 Ferol La., Lynn Haven, Fla. 32444; Clinton R. McCowen, 140 Wynn Haven Beach Rd., Mary Esther, Fla. 32569

[21] Appl. No.: 09/422,163

[22] Filed: Oct. 22, 1999

[51] Int. Cl.[7] ................................................ F16K 31/64
[52] U.S. Cl. ................................ 137/79; 137/62; 251/9
[58] Field of Search ............................ 137/62, 79; 251/9

[56] References Cited

U.S. PATENT DOCUMENTS

| | | | |
|---|---|---|---|
| 1,558,276 | 10/1925 | Peterson | 137/62 |
| 2,058,325 | 10/1936 | Labbe | 137/62 |
| 2,113,022 | 4/1938 | Hefti | 251/9 |
| 2,214,844 | 9/1940 | Van Keuren et al. | 137/62 |
| 4,437,481 | 3/1984 | Chamberlin et al. | 137/60 |
| 4,469,118 | 9/1984 | Walters | 137/62 |
| 4,852,601 | 8/1989 | Chamberlin . | |
| 5,370,279 | 12/1994 | Tardif | 222/214 |
| 6,003,538 | 12/1999 | Smith | 137/79 |

*Primary Examiner*—A. Michael Chambers
*Attorney, Agent, or Firm*—Carnes Cona Dixon

[57] ABSTRACT

A temperature sensitive valve includes a body having an interior area, a top end having an inlet and a lower end having an outlet. The top end is design and configured to be removably secured to an exterior faucet located for allowing water to flow when the temperatures are approaching extreme cold conditions, such as freezing, so as to prevent the pipes from freezing, and eventually bursting. Located within the body, between the inlet and outlet, is a resilient tube situated in a bent position. Affixed to the resilient tube an elongated rod fabricated from a temperature sensitive material. As temperatures approach freezing conditions, the rod will decrease in size and thus move away from the resilient tube, enabling it to move upward and thus, become slightly unbent. This will provide for an opening to exist within the bent region of the tube and enable fluid flow. As temperatures increase and move away from freezing conditions, the rod increases in size, and thus forces the tube downward in a completely bent position, causing a blockage within the bent region. This will prevent fluid flow.

16 Claims, 6 Drawing Sheets

TEMPERATURE SENSITIVE VALVE DEVICE

BACKGROUND OF THE INVENTION

1. Field of the Invention

The present invention relates generally to a temperature sensitive and self-actuating drip valve device attachably secured to any standard outdoor faucet which at cold temperatures will enable a slow flow of fluid to exit through the outdoor faucet so as to prevent freezing to occur with the water pipes leading to the faucet.

2. Description of the Prior Art

It is ubiquitously recognized that during extreme cold conditions in order to prevent water lines from freezing, and innately bursting the particular line, water must be allowed to drip, generally slowly, from the external facet attached to the pipe. Unfortunately, some may not realize that they are experiencing a freeze, and thus fail to activate the water source. Others may simply forget to activate their water line during cold weather condition while some may be away on vacations, and thus physically unable to do so. Whatever the reason, there exists a need to have an external water line automatically activated when the temperature decreases and approaches freezing conditions.

To address this problem, several device have been fabricated which can attach to an external facet and enable water flow during extreme cold condition. Once such device is disclosed in U.S. Pat. No. 4,852,601 issued to Chamberlin. In this patent there is disclose a self-actuating drip valve comprising a tube having a collar at one end for securing to the end of the faucet. Located within the tube is a stem, which when secured, will be adjacent to the facet. Water flow is accomplished via one or more ports, which extend between the faucet and the interior of the tube. The tube and the stem are fabricated from two different material, each having a different coefficient of expansion. Thus, when the outside ambient temperature drops, the tube and stem contract at different rates and the relative movement opens the orifice in the distal end of the tube so as to enable water to drip therethrough. This device, though efficient, does suffer some drawbacks. One drawback is that the device appears to be exceeding long in length, thereby, providing for an overall structure, which may be cumbersome, if not awkward to install. Such an excess length provides a device, which is not aesthetically pleasing. An aesthetically pleasing product, even on a faucet, is a feature that is a necessity with many homeowners today. Yet another drawback is with the use of two different types of materials have different coefficients of expansions. If not precisely placed and secured, the apparatus will not work. Accidentally dropping the device may cause one of the elements made of a different coefficient of expansion to become displaced or bend, thus causing a malfunctioning of the apparatus, rendering it useless.

Accordingly, it is seen that there is a need for an apparatus designed and configured to enable water to drip from an exterior facet as the temperature approaches freezing. The device should be structure so as to be simple in design and to include a minimal amount of components, so as to innately reduce and/or eliminate the possibility of component failure.

As will be seen, the present invention achieves its intended purposes, objectives and advantages, by accomplishing the needs as identified above, through a new, useful and unobvious combination of component elements, which is simple to use, with the utilization of a minimum number of functioning parts, at a reasonable cost to manufacture, assemble, test and by employing only readily available material.

SUMMARY OF THE INVENTION

The present invention is a temperature sensitive valve design and configured to react as the outside temperatures change. This valve device of the present invention is ideally suited for use on a faucet located exterior from a home, resident, office, or the like. The purpose of this valve is to allow water flow when the temperatures are approaching extreme cold conditions, such as freezing, so as to prevent the pipes from freezing, and eventually bursting.

The valve of the present invention includes two embodiments. In each embodiment the valve is structured to have a first end and a second end. The first end includes internal threads for allowing the device to be coupled and removable secured to an external facet. The second end includes an outlet port. This outlet port will permit water to flow therethrough, especially during freezing weather conditions.

Three separate chambers are located within the valve of each embodiment of the present invention. Situated between the first chamber and second chamber is a hollow cylindrical tube, fabricated from a resilient material. This hollow cylindrical tube includes a first section and a second section. The first section is located and secured in a first channel located in proximity to the first end. The second section extends outward from the first channel and into the second chamber.

In the first embodiment of the present invention, at least one elongated spring, which is fabricated from a material, which is sensitive to temperature, such as any metal alloy, is secured within the second chamber and extends downwardly therefrom. This will provide for the first end of the spring to be secured above the second chamber, while the second end of the elongated spring frictionally maintains the bias spring in the downward position. This will cause the resilient tube to be bent. As the ambient temperature changes, the elongated spring alters in shape that will inherently alter the location of the tube.

In the second embodiment of the present invention, located above and butting the first section of the resilient tube, and extending downwardly into the second chamber is a substantially L-shape bias spring. Due to the resiliency of the tube and the structure of the bias spring, the tube is consequently bent and thus, the second section of the bias spring abuts the resilient tube.

A flange is secured to the distal end of the L-shape bias spring, at the second section. This flange acts as a stand or landing to maintain an end of at least one elongated spring which is fabricated from a material which is sensitive to temperature, such as any metal alloy. This end of the elongated spring frictionally maintains the bias spring in the downward position. As the ambient temperature changes, the elongated spring alters in shape that will inherently alter the location of the bias spring. The opposite end, or second end, of the elongated spring is located within a channel that is located above the second chamber.

In both the first and second embodiments, coupled to the second chamber is the third chamber. Once bent the second end of the hollow cylindrical tube will be located within the third chamber. The will provide for the upper area of the bent portion to pass the second chamber and then enter into the third chamber. This third chamber includes the orifice for the exiting means.

In operation of both embodiments, the valve is attached to an exterior faucet and the water is turned on. As ambient temperature decreases and approaches freezing conditions, the metal alloy elongated spring will reduce in size. This reduction in size will force the resilient tube, in the first embodiment, and the bias spring of the second embodiment, to extend upward and enable the tube to extend slightly upward. This upward movement will cause a gap to be located within the bent area of the tube to permit water to flow therethrough. As ambient temperatures increases the metal alloy elongated spring will increase in size and width and hence will force the second section of the tube downward and provide for no opening to exist in the resilient tube. Thereby, preventing water from exiting the facet.

Accordingly, it is the object of the present invention to provide for a temperature sensitive valve which will overcome the deficiencies, shortcomings, and drawbacks of prior temperature sensitive valves and methods thereof.

Another object of the present invention, to be specifically enumerated herein, is to provide a temperature sensitive valve in accordance with the preceding objects and which will conform to conventional forms of manufacture, be of simple construction and easy to use so as to provide a device that would be economically feasible, long lasting and relatively trouble free in operation.

Although there have been many inventions related to a temperature sensitive valve, none of the inventions have become sufficiently compact, low cost, and reliable enough to become commonly used. The present invention meets the requirements of the simplified design, compact size, low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

Similar reference numerals refer to similar parts throughout the several views of the drawings.

DESCRIPTION OF THE PREFERRED EMBODIMENTS

Figure 1:
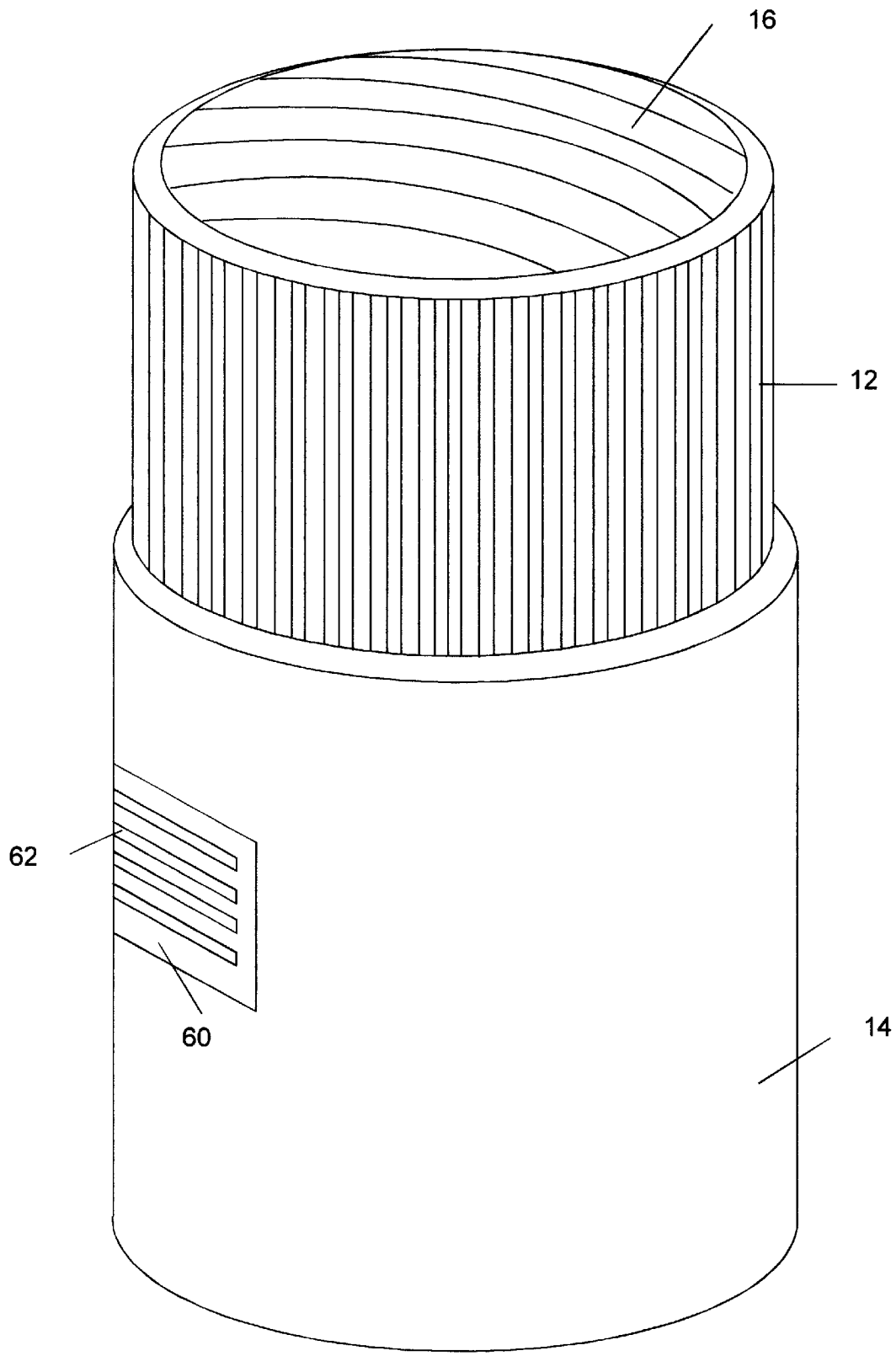
FIG. 1 is a perspective exterior view of the temperature sensitive valve of the present invention used in the first and second embodiments of the present invention.

As seen in the drawings, in particular to FIGS. 1–7 thereof, the present invention, a temperature sensitive valve, denoted by reference numerals 10a and 10b, will be described. The temperature sensitive valve includes a first embodiment, denoted by reference numeral 10a, illustrated in FIGS. 1–3 and 7 and a second embodiment, denoted by reference numeral 10b, illustrated in FIGS. 1 and 4–7. Shown is a valve, ideally suited for outdoor use and one which will enable water to flow from an external faucet as the temperature decreases and approaches freezing conditions. Such a valve will prevent pipes from freezing and innately reduce the possibility of pipes from bursting. This will inherently reduce stress and costs generally associated with freezing temperature conditions.

Figure 2:
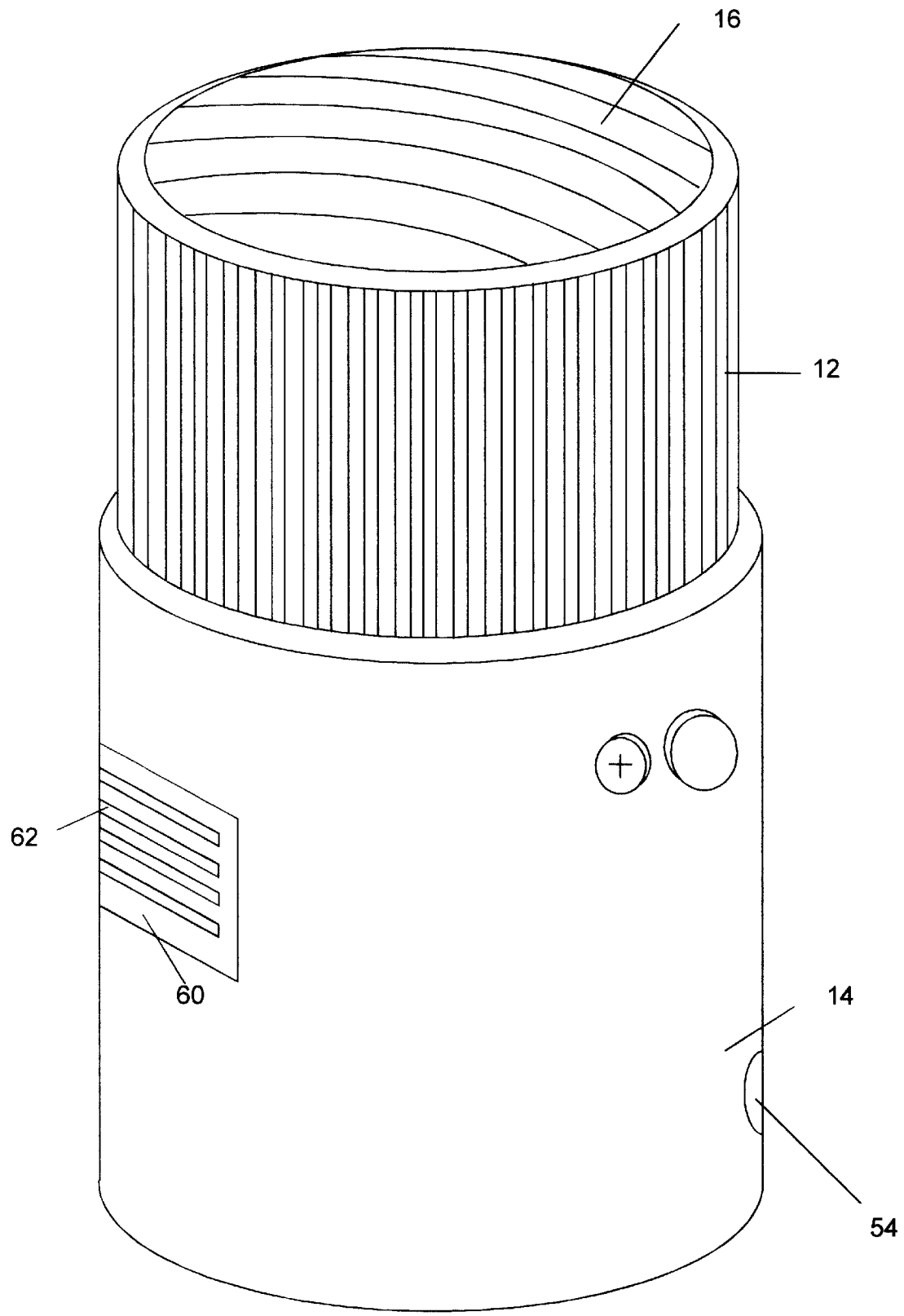
FIG. 2 is an alternative view of the exterior used in the first embodiment of the temperature sensitive valve of the present invention.

As seen in the various figures, in particular FIGS. 1 and 2, the present invention is a substantially cylindrical structure having a first end 12 and a second end 14. The first end 12 includes internal threads 16 for allowing the structure to preferably be removably secured to an outdoor faucet. The second end 14 includes an opening to enable the water to exit and flow therethrough. The second end is fabricated from any conventional material possessing resilient characteristics.

The first embodiment of the present invention will now be described and as seen in the interior view, seen in FIG. 3, the interior of the valve 10a includes three chambers 18a, 18b, and 18c.

The first chamber or upper chamber 18a is located in proximity to the first end of the valve 10a. The second chamber 18b or intermediate chamber is located on the side of the first chamber and slightly downward from the first chamber. Situated directly under the intermediate chamber is the third chamber 18c or lower chamber. This chamber extends downward and to the second end of the second end 14 of the valve 10a, and thus constitutes the opening, which allows for the water to escape.

Coupling the first chamber 18a to the second chamber 18b is a first channel 20. This channel 20 includes a unique shape and configuration. As seen in the drawing, FIG. 3, the channel 20 includes two sections, 22a and 22b. The first section 22a extends downwards from the first chamber 18a. The second section 22b of the first channel 20 extends at an obtuse angle, with respect to the first section 22a. As can be seen from the drawing, the second section 22b extends upwards and towards the second chamber 18b. This will provide for the second section 22b to be angularly disposed thereby, providing for the second section to extend upward from a lower end of the first section 22a.

Partially located within the second section 22b of the first channel 20 is a hollow cylindrical tube 24 fabricated from a resilient material. Providing the tube 24 to be partially located within the second section will provide for a portion of the tube to extend into the second chamber 18b. This tube is fictionally maintained within the second section 22b of the first channel 20. To aid in the securement of the tube within the second section of the channel a step, illustrated, but not labeled can be utilized. This step will act as an inherent stop and thus prevent the tube from slipping.

Secured above the second or intermediate chamber 18b is at least one elongated spring or elongated rod 38 which is fabricated from a material that is sensitive to temperature, such as a temperature sensitive metal alloy. This elongated rod as seen in the drawings includes a first end or upper end 40 and a second end or lower end 42. The upper end 40 is forced into the plug to provide for the elongated rod 38 rod to be frictionally maintained therein. For a more secure fit, and as seen in FIG. 3, a seat 56, can be utilized. Optionally, and as seen in FIG. 3, the elongated rod 38 can be maintained above the second chamber via holding member 56. Holding member 56 is a holding seat and secures the rod to the interior area of the present invention. The use of the holding seat 56 prevents the upper end 42 of the rod from moving and thereby maintains this end in a fixed and secured position. In this fixed and secured position, the lower area of the rod can expand, as deemed necessary by the weather, and thus allow for the tube to open or close.

Figure 3:
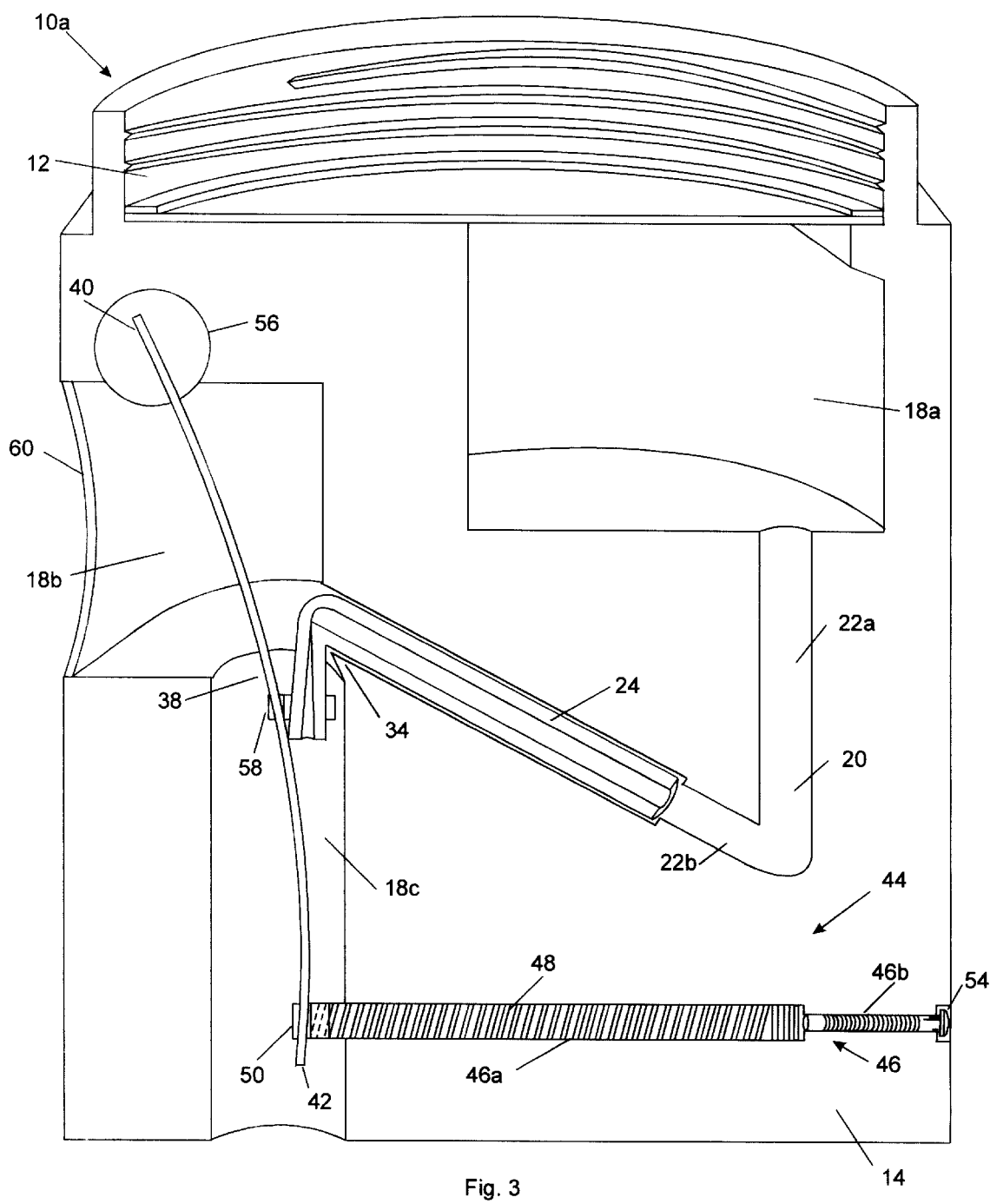
FIG. 3 is a cross sectional view of the first embodiment of the temperature sensitive valve of the present invention.

As seen in FIG. 3, this elongated rod 38 extends completely through the intermediate chamber 18b and partially down through to the third or lower chamber 18c. Maintaining the elongated rod 38 is a retaining system 44. The retaining system comprising an elongated stepped channel 46 extending through the lower portion of plug 10a of the present invention. Located within the first section 46a of the stepped channel 46 is a retaining spring 48. This retaining spring is secured to the lower end 42 of the elongated rod 40 via holding clamp 50. Holding clamp 50 is a conventional component and includes two sections. The first section is a C-section or optionally an O-shape section, for receiving the second end of the elongated rod, and the second section is a cup member, illustrated, but not labeled for receiving an end of the retaining spring 48. This will provide for the holding clamp to be secured to the elongated rod and the retaining spring, thereby maintaining the rod 38 in a fixed and secured position.

The second section 46b, of the step channel 46 include s a setscrew 52 or the like. This set screw is accessible via opening 54, which is illustrated in the exterior view of the anti-freeze plug apparatus of the present invention, shown in FIG. 2 as well as the interior view shown in FIG. 3. The use of this setscrew will enable the rod to be adjusted accordingly. Generally, during production, mechanical tolerances will arise which may slightly alter the location of the rod from its intended position. After assembly, the plug is tested and adjusted via opening 54 and channel 46 and utilizing set screw 52. Once adjusted, a cover can be secured to the opening, or optionally, this opening can be permanently closed. This permanent closure is seen in FIG. 1.

As seen in FIG. 3, the elongated rod 38 will extend from the intermediate chamber 18b to the lower chamber 18c in a downward and angular position. This will cause a portion of the rod to abut the tube 24 and force it to bend downward. This will cause for the bent portion to extend down and into the third or lower chamber 18c. An optionally clamp 58 can be used to secure this elongated rod 38 to the outer end of the tube 24. As seen, this clamp includes two sections. The first section includes a first C-shape member, or first O-shape member, which wraps around tube 24, a second C-shape member, or O-shape member, is secured to the first member. This second member wraps around the elongated rod 38, thus providing for the rod to be affixed to tube 24. During temperature changes, the rod will either expand or contract. This expansion or contraction will provide for the tube to either open or closed.

Other elements can be used for testing the tolerances and flow rate of the water. These elements are optional, and though not necessary, if used would merely be utilized after fabrication the final product. After fabrication the product would be tested for the verification of functionality. One element is the use of an adjustment knob. This knob would be located on the top area of the device, as seen in figure 1b, illustrated but not labeled. This knob would control flow of the water entering the device of the present invention. Hence, this knob would extend into the inlet and increase or decrease the size of the opening that constitutes the inlet. A setscrew, illustrated, but not labeled, can also be used to hold and maintain the knob in a fixed and secured position. This setscrew would be such that if it were desirable to change or alter the location of the knob, the setscrew would be utilized. This will provide for the setscrew to control and manipulate the location of the knob. A third element is the setscrew 52, which is discussed above. This third element like the knob and the setscrew maintaining the knob, are optional, and if used, would only be utilized for testing purposes.

For exposing the spring 38 to ambient temperatures, a plate 60 is utilized. This plate 60 is illustrated in FIGS. 1–3 and 7. As seen this plate 60 is secured to the plug and in located in proximity to the second or intermediate chamber. Vents 62 extend through the plate, for allowing ambient air to circulate therein and for rending the elongated rod 38 to be exposed to the changing temperate of the environment.

In operation, the valve is attached to an exterior faucet. The elongated spring 38 is designed to control the bentness of the tube 24. Hence, as the temperature sensitive elongated spring increases in size, it forces the tube 24 down. The downward motion innately applies pressure to the outer surface of the resilient tube. Since the opposite side of the tube 24 rests against stationary point 34, the downward force from the rod and stationary point will cause the tube to bend. Dependent upon the amount of force applied, the tube, during "non-freezing" weather conditions will be completely bent to provide for a blockage to exist within the interior of the tube. Thereby, causing the bent tube to be in a closed position, as seen in FIG. 3.

Due to the vents 62, located within the plate 60, the spring or rod 38 is constantly exposed to ambient temperatures. As ambient temperatures decrease and approach freezing conditions, the metal alloy elongated spring or rod 38 will reduce in size. This reduction in size will force the elongated spring to shrink and inherently cause the spring to move away from the tube. This movement will cause the tube to extend slightly upward. The upward movement will cause the tube to move upward and to slightly unbend. This movement causes a gap to be located within the semi-bent area of the tube to permit water to flow therethrough.

Alternatively, the resilient tube 24 can be maintained within the connecting channel 20 via a holding clamp. The use of a holding clamp constitutes a second embodiment of the present invention and is illustrated in further detail in FIGS. 4–6.

In the second embodiment, securing the first side of the resilient tube 24 within the second section 22b of the connecting channel 20, is a holding clamp 26. The holding clamp 26 is illustrated in further detail in FIGS. 3, 4 and 5. As shown, the holding clamp includes a semi-cylindrical body 28. This semi-cylindrical body 28 will maintain the hollow resilient tube 24. It is noted that the body 28 need not be semi-cylindrical or C-shape, but rather, can be a hollow cylindrical body. The use of the C-shape member will reduce the materials needed for manufacturing the clamp. The purpose of the body 28 is to maintain the tube within the channel and to enable a resilient L-shape bias spring member 30 to be secured thereto. Hence, the body can have any shaped as deemed necessary by the manufacture and user. It is further noted that this hollow body 28 can be used with the first embodiment of the present invention for securing the resilient tube within the channel 20. This is an optional configuration.

Figure 4:
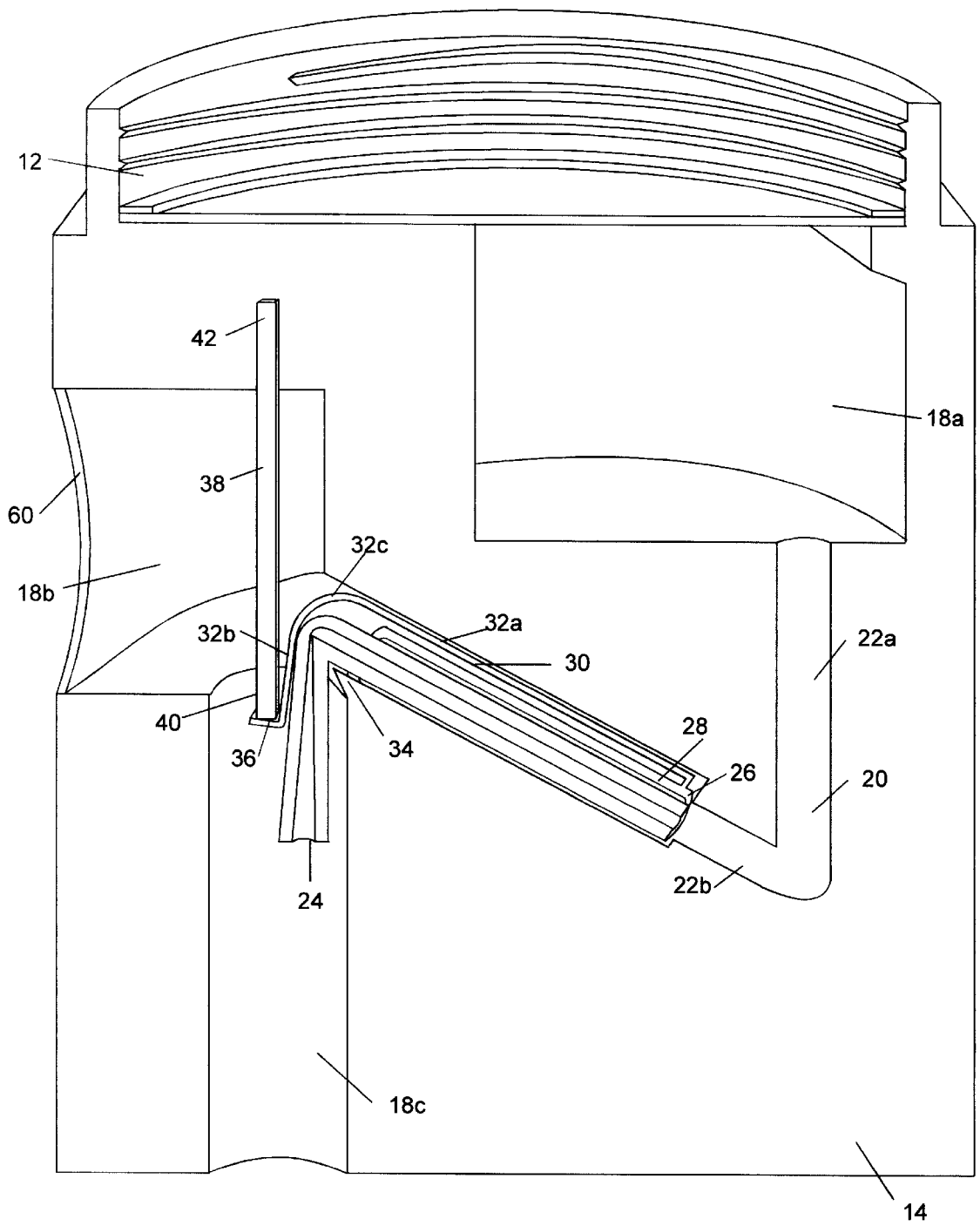
FIG. 4 is a cross sectional view of the second embodiment of the temperature sensitive valve of the present invention.
Figure 5:
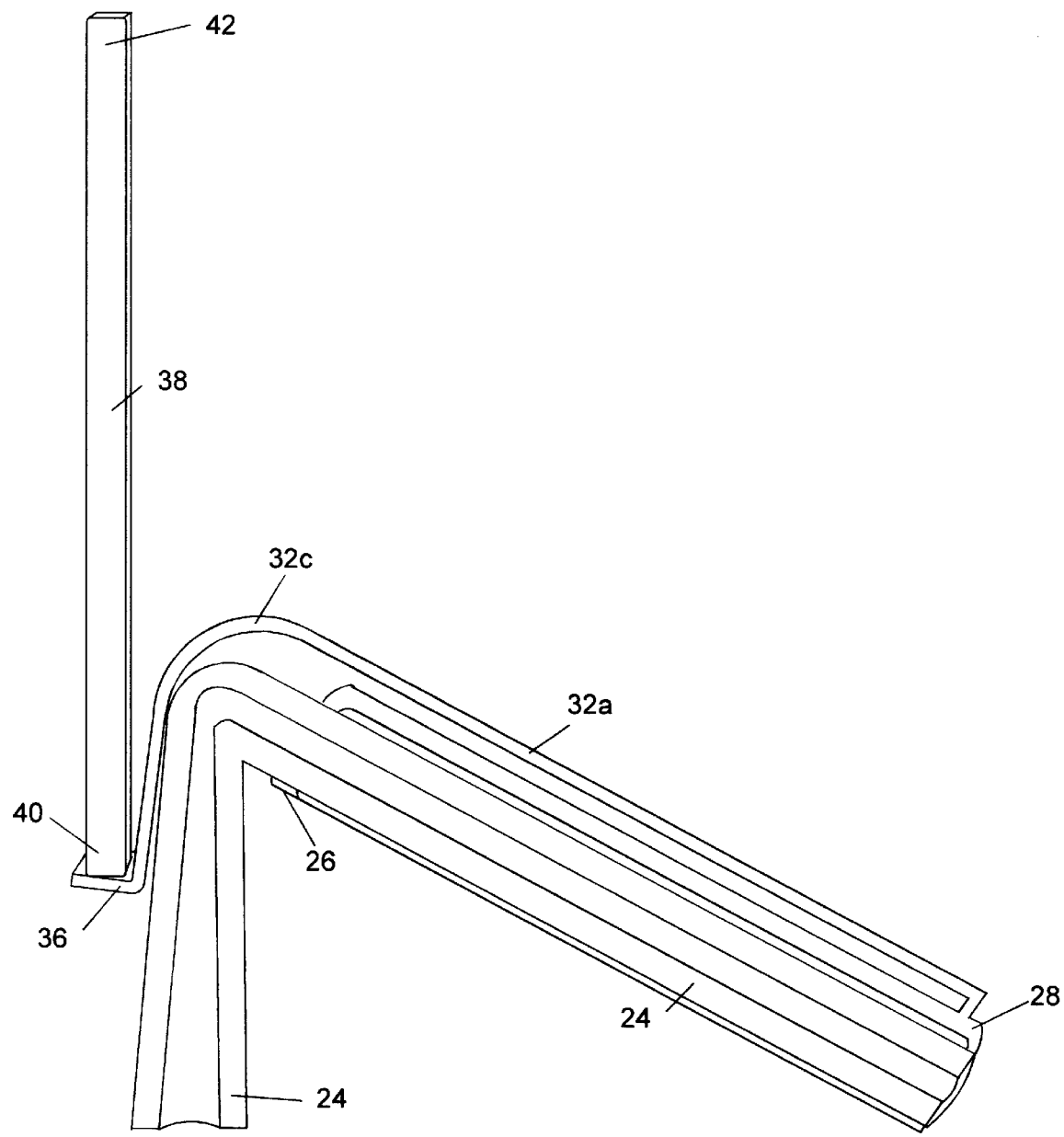
FIG. 5 is an enlarged view of the clamp used to hold the spring used in the second embodiment of the temperature sensitive valve of the present invention and illustrating the resilient tube to be in an opened position.
Figure 6:
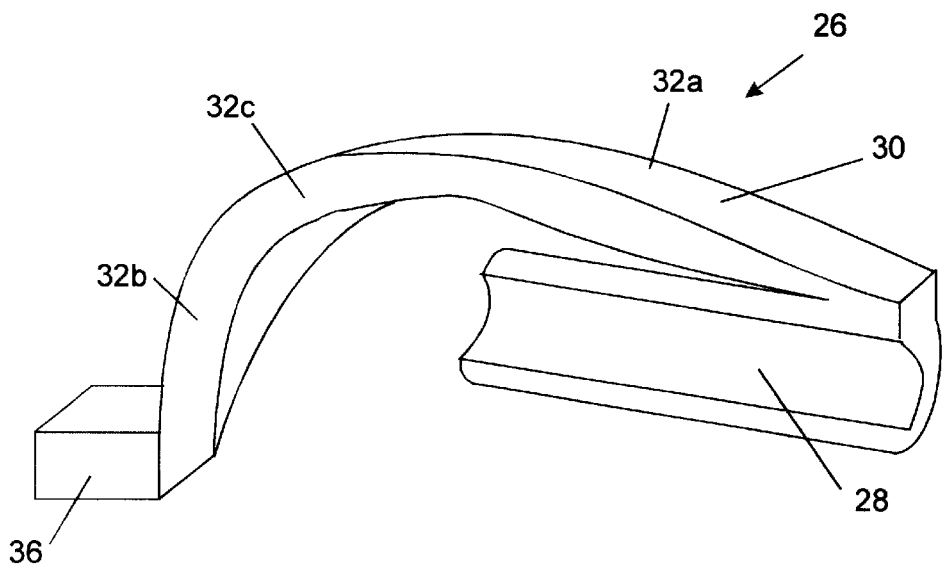
FIG. 6 is an enlarged perspective view of the clamp used to hold the spring used with the second embodiment of the temperature sensitive valve of the present invention.
Figure 7:
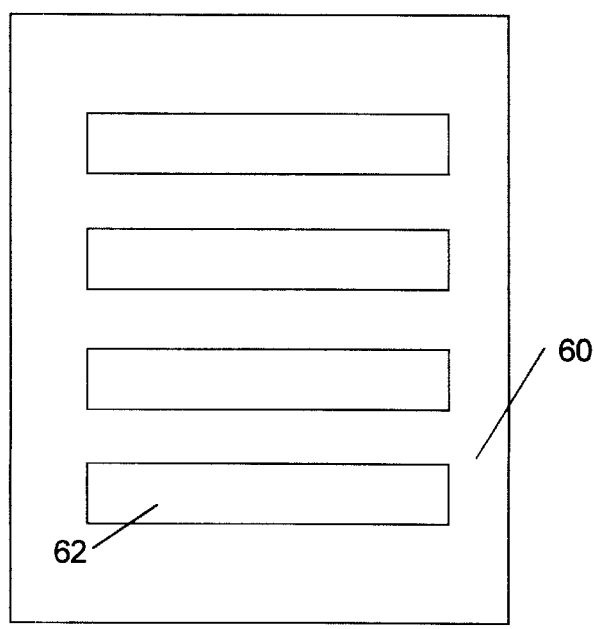
FIG. 7 is a front view of the plate used to expose the temperature sensitive spring to ambient temperatures in both the first and second embodiments of the temperature sensitive valve of the present invention.

As seen in FIGS. 4–6 secured to the top surface of the holding clamp 26 is the L-shape bias spring member 30. The bias spring member 30 includes a first segment 32a and a second segment 32b. The angular placement of each section innately forms the L-shape structure.

The bias spring 30 is located above and in close proximity to the hollow cylindrical tube. Due to the resiliency of the tube and the substantially rigid and L-shape structure of the bias spring 30, the tube is consequently bent. The second segment 32b of the spring 30 forces the resilient tube 24 to bend. To aid in bending the tube a point 34 is formed within the lower portion 14 of the plug to provide for the point 34 to be located in proximity to the interior side of the resilient tube 24, opposite from the bent elbow region 32c of the spring 30.

A flange 36 is secured to the distal end of the L-shape bias spring, at the second segment 32b. This flange 36 acts as a stand or landing to maintain an end of at least one elongated spring 38 which is fabricated from a material which is sensitive to temperature, such as any metal alloy. This first end 40 of the elongated spring 38 frictionally maintains the bias spring in the downward position. As the ambient temperature changes, the elongated spring alters in shape that will inherently alter the location of the bias spring.

The second end 42 of the elongated spring 38 is located within a plug and is maintained frictionally. Since the plug is fabricated from a resilient material, the elongated spring 38 is pushed into the plug, above the second chamber 18b, and is thus maintained therein. Optionally, a retaining seat, such as the one illustrated in FIG. 3 and denoted by reference numeral 56, can be utilized.

For exposing the temperature sensitive spring 38 to ambient temperature, a plate 60, substantially the same as the plate utilized in the first embodiment, including a plurality of vents 62, extending therethrough, is secured exteriorly to the second chamber 18b. The plate 60 is seen in FIG. 1 and FIG. 2. The vents 62 enable air to enter into the second chamber, and thus, allow for the spring 38 to be exposed to the ambient temperature for rendering the spring to react accordingly.

Coupled to the second chamber 18b is the third chamber 18c. Once bent the second end of the hollow cylindrical tube 24 will be located within the third chamber. This will provide for the upper area of the bent portion to pass the second chamber and then enter into the third chamber. This third chamber includes the opening for the exiting means 50.

In operation, the valve is attached to an exterior faucet. The elongated spring 38 is designed to control the L-shape bias spring 30 via flange 36. Hence, as the temperature sensitive elongated spring increases in size, it forces the flange 36 down, consequently causing the elbow region 32c to extend down. The downward motion innately applies pressure to the upper surface of the resilient tube down. Since the opposite side of the tube 24 rests against stationary point 34, the downward force from the elbow 32c and second segment 32b, will cause the tube to bend. Dependent upon the amount of force applied, the tube, during "non-freezing" weather conditions, will be completely bent to provide for a blockage to exist within the interior of the tube. Thereby, causing the bent tube to be in a closed position, as seen in FIG. 4.

Due to the vents 62, located within the plate 60, the spring 38 is exposed to ambient temperature. As ambient temperature decreases and approaches freezing conditions, the metal alloy elongated spring 38 will reduce in size. This reduction in size will force the bias spring to shrink and inherently cause the second end 40 to extend upward and enable the bias spring 30 to extend upward. This upward action causes the tube to extend slightly upward. This upward movement will cause the L-shape member to extend upward. The upward movement will cause the tube to move upward and to slightly unbend. This movement causes a gap to be located within the semi-bent area of the tube to permit water to flow therethrough, as seen in FIG. 5.

While the invention has been particularly shown and described with reference to an embodiment thereof, it will be understood by those skilled in the art that various changes in form and detail may be made without departing from the spirit and scope of the invention.

We claim:

1. A temperature sensitive valve device comprising:
   a body having an interior area, a first end and a second end;
      said first end includes an opening for defining an inlet and an attaching element for attaching said body to an exterior facet;
      said second end includes an opening forming an outlet;
   a hollow resilient tube is located substantially horizontally and in a slightly bent position within said body;
   at least one rod fabricated from a temperature sensitive material is secured within said body and extends substantially vertically within said body, said at least one rod is secured to said resilient tube via a holding device;
   a vent extends through said body for exposing said at least one rod to ambient temperatures; and
   wherein as ambient temperatures decrease said at least one rod will decrease in size to provide for a lower area of said resilient tube to lift upwards for establishing an clearance to exist within said hollow resilient tube for allowing fluid to flow therethrough, and as ambient temperatures rise said at least one rod will increase in size to provide for said lower area of said resilient tube to be pushed downward for preventing a clearance to exist, thereby preventing water flow therein.

2. A temperature sensitive valve device as in claim 1 wherein said at least one rod is fabricated from a metal alloy.

3. A temperature sensitive valve device as in claim 1 wherein a resilient member is secured to an end of said at least one rod and said resilient member is embedded within said body to provide for said at least one rod to be secured therein.

4. A temperature sensitive valve device as in claim 1 wherein said rod includes an upper end a middle section and a lower end, said upper end is secured within said body, said middle section is secured, via said holding device to said resilient tube, and said lower end is secured to a second holding device.

5. A temperature sensitive valve device as in claim 4 wherein said second holding device comprises a stepped channel extending horizontally through said body, said stepped channel includes an inner region and an outer region, said inner region being larger in diameter than said outer region, a spring is located within said inner region, a holding champ is secured to said spring and said second end of said at least one rod for providing said at least one rod to be secured to said spring, said outer region is adapted to receive a set screw for adjusting tension of said spring.

6. A temperature sensitive valve device as in claim 1 wherein said first end of said body is internally threaded.

7. A temperature sensitive valve device as in claim 1 wherein said interior area of said device includes a channel having a first section and a second section, said first section extends downwardly and substantially vertically, said second section extends upwardly from said first section, said resilient tube is partially located within said second section of said channel and extends outward from said second section, said holding device and said at least one rod forces said resilient member into a bend position.

8. A temperature sensitive valve device as in claim 7 wherein said second section of said channel includes a step and said step acts as a stop for said resilient tube.

9. A temperature sensitive valve device as in claim 7 said second holding device comprises a stepped channel extending horizontally through said body, said stepped channel includes an inner region and an outer region, said inner region being larger in diameter than said outer region, a spring is located within said inner region, a holding champ is secured to said spring and said second end of said at least one rod for providing said at least one rod to be secured to said spring, said outer region is adapted to receive a set screw for adjusting tension of said spring.

10. A temperature sensitive valve device as in claim 9 wherein a resilient member is secured to an end of said at least one rod and said resilient member is embedded within said body to provide for said at least one rod t o be secured therein.

11. A temperature sensitive valve device as in claim 7 wherein second section is step to provide for providing a stop and preventing said resilient tube to slip.

12. A temperature sensitive valve device as in claim 7 wherein said body includes a point region located under a bent area of said hollow resilient tube for aiding and assisting in bending said hollow resilient tube.

13. A temperature sensitive valve device as in claim 7 wherein said rod includes an upper end a middle section and a lower end, said upper end is secured within said body, said middle section is secured, via said holding device to said resilient tube, and said lower end is secured to a second holding device, said second holding device comprises a stepped channel extending horizontally through said body, said stepped channel includes an inner region and an outer region, said inner region being larger in diameter than said outer region, a spring is located within said inner region, a holding champ is secured to said spring and said second end of said at least one rod for providing said at least one rod to be secured to said spring, said outer region is adapted to receive a set screw for adjusting tension of said spring.

14. A temperature sensitive holding device as in claim 7 wherein a holding mechanism secures said resilient tube within said second section of said channel, said holding mechanism is at least partially surrounds said resilient tube.

15. A temperature sensitive holding device as in claim 14 wherein an L-shape bias spring member is secured above said holding mechanism, said L-shape portion includes a first segment and a second segment forming the L-shape configuration, said second segment extends downwardly and forces said resilient hollow tube in a bent position.

16. A temperature sensitive holding device as in claim 15 wherein a flange extends outwardly from said second segment, said flange receives maintains said at least one rod.

\* \* \* \* \*